(12) United States Patent
Fujino

(10) Patent No.: US 12,548,250 B2
(45) Date of Patent: Feb. 10, 2026

(54) CONTENT PROVISION DEVICE

(71) Applicant: NTT DOCOMO, INC., Tokyo (JP)

(72) Inventor: Hiroyuki Fujino, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 185 days.

(21) Appl. No.: 18/558,499

(22) PCT Filed: Mar. 16, 2022

(86) PCT No.: PCT/JP2022/011994
§ 371 (c)(1),
(2) Date: Nov. 1, 2023

(87) PCT Pub. No.: WO2022/234724
PCT Pub. Date: Nov. 10, 2022

(65) Prior Publication Data
US 2024/0242431 A1    Jul. 18, 2024

(30) Foreign Application Priority Data

May 6, 2021  (JP) .................................. 2021-078475

(51) Int. Cl.
*G06T 17/00*    (2006.01)
*G06F 3/01*    (2006.01)
*G06F 3/14*    (2006.01)

(52) U.S. Cl.
CPC .............. *G06T 17/00* (2013.01); *G06F 3/013* (2013.01); *G06F 3/14* (2013.01)

(58) Field of Classification Search
CPC ............ G06T 17/00; G06F 3/013; G06F 3/14
(Continued)

(56) References Cited

U.S. PATENT DOCUMENTS

2006/0273984 A1* 12/2006 Wanda .................. A63F 13/213
                                                    345/7
2011/0216060 A1*  9/2011 Weising ................. A63F 13/00
                                                    345/419

(Continued)

FOREIGN PATENT DOCUMENTS

WO    WO 2017/191700 A1    11/2017

OTHER PUBLICATIONS

International Preliminary Report on Patentability and Written Opinion issued Nov. 16, 2023, in PCT/JP2022/011994, 6 pages.

(Continued)

*Primary Examiner* — Hai Tao Sun
(74) *Attorney, Agent, or Firm* — Oblon, McClelland, Maier & Neustadt, L.L.P.

(57) ABSTRACT

A content provision device 10 provides a content image indicating a virtual space which is shared by a plurality of users to the users. The content provision device 10 includes: an identification unit 12 configured to identify a gaze area at which each of the users gazes in a period of a predetermined threshold value or more in the virtual space; a setting unit 13 configured to count the number of users gazing at a virtual object disposed in the virtual space based on a positional relationship between the gaze area of each of the users and the virtual object and to set a degree of attention based on the count result for the virtual object; and a delivery unit 14 configured to notify the users of the degree of attention set for the virtual object.

9 Claims, 9 Drawing Sheets

(58) Field of Classification Search
USPC .......................................................... 345/419
See application file for complete search history.

(56) References Cited

U.S. PATENT DOCUMENTS

| 2018/0232928 A1* | 8/2018 | Grant ...................... G06T 13/40 |
| 2019/0114823 A1 | 4/2019 | Ohba et al. |
| 2023/0177787 A1* | 6/2023 | Nakata .................... G06F 21/10 |
| | | 345/419 |

OTHER PUBLICATIONS

International Search Report mailed on Jun. 7, 2022 in PCT/JP2022/011994 filed on Mar. 16, 2022, therein, 2 pages.

* cited by examiner

CONTENT PROVISION DEVICE

TECHNICAL FIELD

An aspect of the present invention relates to a content provision device that provides content representing a virtual space.

BACKGROUND ART

A structure that generates an image for allowing a user to ascertain a place which another user sees for the purpose of achieving smooth communication between users in a virtual space which is shared by a plurality of users is known (see Patent Document 1).

CITATION LIST

Patent Document

[Patent Document 1] PCT International Publication No. WO 2017/191700

SUMMARY OF INVENTION

Technical Problem

However, by displaying positions at which users gaze in a virtual space as in the structure disclosed in Patent Document 1, promotion of communication between the users at that time only is achieved and there is room for improvement in enhancing an entertainment property of a virtual experience of users.

Therefore, an objective of an aspect of the present invention is to provide a content provision device that can effectively improve an entertainment property of a virtual experience of users.

Solution to Problem

According to an aspect of the present invention, there is provided a content provision device that provides a content image indicating a virtual space which is shared by a plurality of users to the users, the content provision device including: an identification unit configured to identify a gaze area at which each of the users gazes in a period of a predetermined threshold value or more in the virtual space; a setting unit configured to count the number of users gazing at a virtual object disposed in the virtual space based on a positional relationship between the gaze area of each of the users and the virtual object and to set a degree of attention based on the count result for the virtual object; and a notification unit configured to notify the users of the degree of attention set for the virtual object.

In the content provision device according to the aspect of the present invention, a gaze area at which each of the users gazes in a period of a predetermined threshold value or more in the virtual space is identified, and the number of users gazing at a virtual object disposed in the virtual space is counted based on a positional relationship between the gaze area and the virtual object. A degree of attention based on the count result is set for the virtual object, and the users are notified of the degree of attention set for the virtual object. Accordingly, with the content provision device, it is possible to automatically set an attention status of each virtual object in the virtual space and to notify the user of the attention status of each virtual object in real time. With this structure, it is possible to effectively improve an entertainment property of a virtual experience of users.

Advantageous Effects of Invention

According to the aspect of the present invention, it is possible to provide a content provision device that can effectively improve an entertainment property of a virtual experience of users.

DESCRIPTION OF EMBODIMENTS

Hereinafter, an embodiment of the present invention will be described in detail with reference to the accompanying drawings. In description with reference to the drawings, the same or corresponding elements will be referred to by the same reference signs and description thereof will not be repeated.

Figure 1:
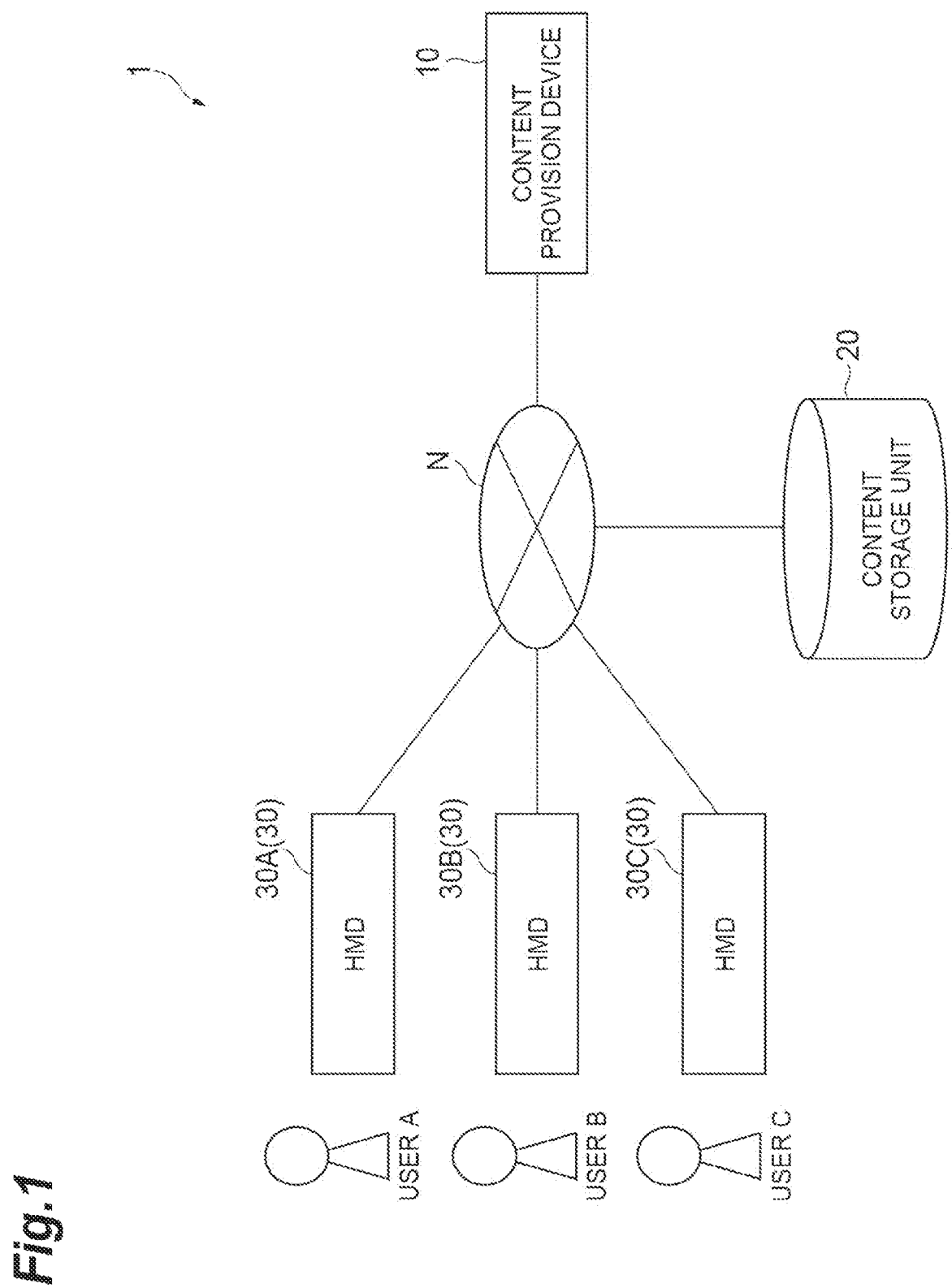
FIG. 1 is a diagram illustrating an example of a content provision system according to an embodiment.

FIG. 1 is a diagram illustrating an example of a content provision system 1 according to an embodiment. The content provision system 1 is a computer system that provides (delivers) content to a plurality of users. Content is person-recognizable information that is generated and provided by one or more computer devices.

Electronic data indicating content is referred to as content data. Content can be expressed, for example, by an image, text, a vocal sound, or a combination of two or more of these elements.

The content provision system 1 includes a content provision device 10, a content storage unit 20, and a head-mounted display (HMD) 30 which is a user terminal carried by each of a plurality of users. In the content provision system 1, the content provision device 10 generates content data and delivers the generated content data to the HMDs 30 of the users to provide content to the users. In this embodiment, for example, content indicating the same virtual space is provided to the HMDs 30 of a plurality of users. As a result, a common virtual space is shared by the plurality of users. In this embodiment, content includes at least a content image indicating a virtual space. The content image may be a moving image (a video) or may be a still image.

The content image represents a virtual space in which a virtual object is present. The virtual object is an object which is not present in the real world and present only in the computer system. The virtual object can be expressed by two-dimensional or three-dimensional computer graphics (CG). The virtual object may be expressed using an image material such as an animation material different from a photographed image or may be expressed realistically based on a photographed image. The virtual space is a two-dimensional or three-dimensional virtual space which is expressed by an image displayed on a computer. The content image is, for example, an image representing a view from a virtual camera set in the virtual space. The virtual camera is set in the virtual space to correspond to a gaze of a user seeing the content image (a gaze of a user detected by the HMD 30 in this embodiment). The virtual camera is set for each user. More specifically, a virtual camera for each user is set depending on a position of the user (that is, an avatar corresponding to the user) in the virtual space. When AR or MR which will be described later is provided to a user, the content image or the virtual space may further include a real object which is an object that is actually present in the real world.

An example of the virtual object is an avatar which is a user's alternative ego. The avatar may be expressed using animation materials or may be expressed realistically based on a photographed image of a user. A position and a direction of the virtual camera may match a viewpoint and a gaze of the avatar. In this case, a content image of a first-person viewpoint is provided to the user. Alternatively, the position and the direction of the virtual camera may not match the viewpoint and the gaze of the avatar. For example, the virtual camera may be disposed in a space behind the avatar or the like. In this case, a content image of a third-person viewpoint is provided to the user. The user can experience augmented reality (AR), virtual reality (VR), or mixed reality (MR) by seeing the content image.

The content provision device 10 is a computer device that transmits (provides or delivers) content data including a content image to the HMD 30 of each user. The content provision device 10 is communicatively connected to the content storage unit 20 and the HMD 30 of each user via a communication network N. The communication network N can be constituted, for example, by an arbitrary type of network such as the Internet or an intranet.

The content storage unit 20 is a non-transitory storage medium or a storage device that stores content data. The content data includes, for example, virtual space information and virtual object information which will be described later.

The virtual space information is electronic information indicating a virtual space constituting content. For example, the virtual space information includes information on background data of the virtual space, arrangement of virtual objects arranged in the virtual space, arrangement (positions and directions) of virtual cameras of users, and the like. For example, when the virtual space is constituted as a three-dimensional coordinate space which is expressed by an X axis, a Y axis, and a Z axis orthogonal to each other, the virtual space information can include three-dimensional position coordinates (XYZ coordinates) of virtual objects (which include avatars) as information on arrangement of the virtual objects. The virtual space information can include information on a posture of each avatar (such as positions of parts which will be described later) as information on arrangement of avatars. The information on a position of a virtual camera (that is, information corresponding to a user's viewpoint in the virtual space) can be expressed by three-dimensional coordinates similarly to the information on arrangement of virtual objects. The information on the direction of the virtual camera (that is, information corresponding to the user's gaze) can be expressed by a three-dimensional vector.

The virtual object information is electronic information for defining each virtual object. For example, the virtual object information includes information indicating a shape and a size of a virtual object and motions which can be performed by the virtual object. For example, the virtual object information includes identification information for identifying each avatar (hereinafter referred to as an "avatar ID"), graphics information indicating the appearance of each avatar, and configuration information indicating a configuration of each avatar. In this embodiment, each avatar includes a plurality of parts (partial areas). In this case, the configuration information of each avatar includes, for example, information on parts of the avatar. Examples of the parts include a head, a trunk, an arm, and a leg of the avatar. The parts are distinguished, for example, by intermediation parts (joints) set for the avatar. Examples of the joints set for an avatar include parts which are bent such as a neck, a shoulder, an elbow, a hip joint, and a knee. By partitioning an avatar's body using the joints, the avatar can be partitioned into the aforementioned parts. The parts of an avatar are not limited to the aforementioned parts of the avatar's body. For example, when an avatar wears accessories such as a sword, decorations such as a necklace, and the like, the accessories or decorations may be handled as parts of the avatar. That is, the aforementioned items (for example, costumes, accessories, and decorations) worn on the body by the avatar (which are correlated with the avatar) in addition to the living body of the avatar may be handled as parts of the avatar.

The HMD 30 is a computer device that is used by a user who uses content. The HMD 30 is a device that is worn on the user's head. For example, the HMD 30 includes a display that is disposed in front of both eyes of the user, a camera that is disposed in front of both eyes of the user and can image a range including both eyes of the user, and a communication device that transmits and receives data to and from the content provision device 10. The HMD 30 includes a control unit (for example, a computer device including a processor and a memory) that controls operations of the camera, the display, the communication device, and the like.

Examples of the HMD 30 include a glasses type device (for example, smart glasses such as so-called XR glasses), a goggle type device, and a hat type device. In FIG. 1, an HMD 30A used by a user A (a first user), an HMD 30B used by a user B, and an HMD 30C used by a user C are illustrated as an example of some of a plurality of HMDs 30 connected to the content provision device 10.

Figure 2:
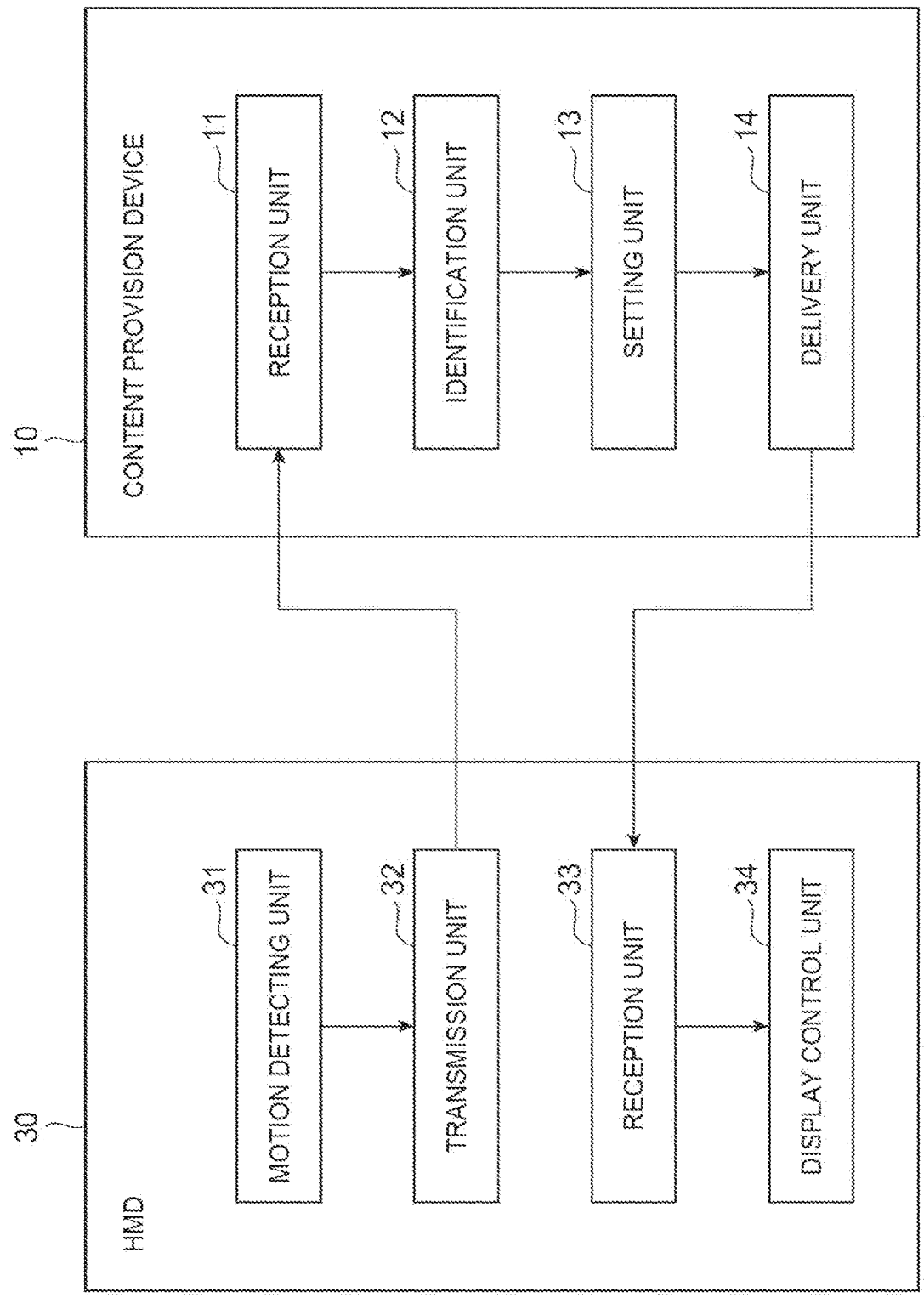
FIG. 2 is a diagram illustrating an example of a functional configuration of the content provision system.

FIG. 2 is a diagram illustrating an example of a functional configuration of the content provision system 1 (the content provision device 10 and the HMD 30). As illustrated in FIG. 2, the HMD 30 includes a motion detecting unit 31, a transmission unit 32, a reception unit 33, and a display control unit 34. The content provision device 10 includes a reception unit 11, an identification unit 12, a setting unit 13, and a delivery unit 14.

The functional elements of the HMD 30 will be first described below.

The motion detecting unit 31 detects a motion of a user who wears the HMD 30. The motion detecting unit 31 detects a motion of a user's eyes. The motion detecting unit 31 detects gazes of a user's eyes in the real world, for example, based on an image captured by the aforementioned camera. The motion detecting unit 31 may additionally detect a gaze position (a focal position) at which the detected gazes of the user's eyes cross each other and calculate a distance (a focal distance) from the positions (viewpoints) of the user's eyes to the gaze position. In this embodiment, for example, the motion detecting unit 31 acquires a gaze direction of the user's eyes and the focal distance detected in the real world as described above as gaze information on the gazes of the user.

For example, when a user performs an operation for instructing change of a position, a pose, or the like of an avatar which is the user's alternative ego in the virtual space using a controller or the like attached to the HMD 30, the motion detecting unit 31 may further acquire information on the operation (hereinafter referred to as "operation information"). This operation information is used to determine a position or a pose of an avatar corresponding to the user in the virtual space. A method of inputting the operation information for determining the position or the pose of the avatar is not limited to the method using the controller. For example, a technique of attaching a sensor or the like for detecting a motion of a user's body to the user's body and reflecting the user's motion in the real world to an avatar in the virtual space is considered. In this case, information indicating the user's motion (motion information) detected by the sensor may be acquired as the operation information.

The transmission unit 32 transmits the motion information including gaze information acquired by the motion detecting unit 31 to the content provision device 10. When the operation information is acquired by the motion detecting unit 31, the motion information includes the operation information.

The reception unit 33 receives content data including a content image from the content provision device 10.

The display control unit 34 displays the content image acquired by the reception unit 33 on the display of the HMD 30.

Functional elements of the content provision device 10 will be described below.

The reception unit 11 acquires the motion information of users from the HMDs 30 of the users.

The identification unit 12 identifies a gaze area at which each user has gazed in a predetermined threshold period or more (for example, 5 seconds) in the virtual space. The threshold period can be arbitrarily determined, for example, by an operator of the content provision device 10. The threshold period can be set to, for example, a length with which it can be determined that a "user gives attention to an object present at an end of a gaze" (for example, a length acquired based on ergonomic view or experiment). For example, the identification unit 12 identifies a gaze area of each user by performing a process for one user (for example, the user A) which will be described below on all the users.

For example, when the operation information of the user A is received by the reception unit 11, the identification unit 12 updates a position or a pose of the avatar of the user A in the virtual space based on the operation information. That is, the identification unit 12 updates the virtual space information on the avatar of the user A stored in the content storage unit 20. When the operation information of the user A is not received by the reception unit 11, the identification unit 12 does not update the virtual space information on the avatar of the user A.

The identification unit 12 identifies a position which is seen by the user A in the virtual space by considering gaze information of the user A in addition to the position and the pose of the avatar of the user A stored in the content storage unit 20. For example, when a viewpoint of the avatar of the user A is the position of the virtual camera of the user A (that is, when a content image of a first-person viewpoint which is the avatar's viewpoint is provided to the user A), the identification unit 12 identifies a position in the virtual space which the avatar of the user A looks over. For example, the identification unit 12 can identify the position of the viewpoint of the avatar in the virtual space from the virtual space information on the position and the pose of the avatar of the user A. The identification unit 12 can identify a position in the virtual space which the avatar of the user A looks over based on gaze information (for example, a gaze direction and a focal distance) of the user A detected in the real world. That is, the identification unit 12 can identify coordinates of the position in the virtual space which the avatar of the user A looks over by further referring to the gaze information using the identified position of the viewpoint of the avatar as coordinates of the origin.

The identification unit 12 can identify coordinates of the position at which the user A gazes in the virtual space at intervals of a predetermined time (for example, 1 second), for example, by performing the aforementioned process at intervals of the predetermined time. The identification unit 12 determines whether a plurality of coordinates (for example, a plurality of coordinates acquired in a period with a length corresponding to the threshold period) acquired latest at intervals of the predetermined time are located in a range of a predetermined threshold distance with reference to the plurality of coordinates. In other words, the identification unit 12 determines whether the position which the user A gazes stays in a local area (the range of the threshold distance) in the threshold period or more. When it is determined that the plurality of coordinates are located in the range of the threshold distance, the identification unit 12 identifies a gaze area based on the plurality of coordinates. For example, the identification unit 12 may identify a spherical area with a minimum radius including all the plurality of coordinates as a gaze area.

The setting unit 13 counts the number of users gazing a virtual object based on a positional relationship between the gaze areas of the users identified by the identification unit 12 and the virtual object disposed in the virtual space and sets a degree of attention based on the count result in the virtual object. In this embodiment, the virtual object for which the degree of attention is set is an avatar of each user. For example, the setting unit 13 performs a process for one user (for example, the user A) which will be described below on the users.

For example, the setting unit 13 determines whether the gaze area of the user A overlaps with an avatar of each user (hereinafter referred to as "other user") other than the user A (that is, one part of the avatar) by comparing the gaze area of the user A with positions of avatars (including positions of parts) of the other users other than the user A stored in the content storage unit 20. When it is determined that the gaze area of the user A overlaps with an avatar of the other user, the setting unit 13 determines that the user A gazes at the avatar of the other user. The setting unit 13 counts the number of users who gaze an avatar for each avatar by repeatedly performing this process on each user. Then, the setting unit 13 stores the degrees of attention based on the count result of the avatars in the content storage unit 20 in correlation with avatar IDs of the avatars.

The setting unit 13 may determine whether the gaze area of the user A overlaps with a specific part of an avatar of another user by comparing the gaze area of the user A with positions of parts of each avatar. When it is determined that the gaze area of the user A overlaps with the specific part, the setting unit 13 may determine that the user A gazes at the specific part of the avatar of the other user. The setting unit 13 may count the number of users gazing a part for each part of the avatar by repeatedly performing this process on each user. Then, the setting unit 13 may store degrees of partial attention based on the count result of the parts in the content storage unit 20 in correlation with the parts. For example, when identification information (hereinafter referred to as a "part ID") is allocated to each part of an avatar, the setting unit 13 may store a degree of partial attention for a specific part of a specific avatar in the content storage unit 20 in correlation with a group of the avatar ID of the specific avatar and the part ID of the specific part.

A degree of attention correlated with an avatar may be the number of users gazing at the avatar itself or may be a level (a step value) based on the number of users gazing at the avatar. For example, a level "1" is set as a degree of attention when the number of users gazing at an avatar ranges from 0 to 10, a level "2" is set as a degree of attention when the number of users gazing at an avatar ranges from 10 to 50, and a level "3" is set as a degree of attention when the number of users gazing at an avatar equal to or greater than 50. The same is true of degrees of partial attention correlated with parts.

When it is determined that the same user has gazed at the same avatar a plurality of times, the number of users gazing at the avatar may be added by one or may be increased by one every determination. That is, the number of gazing users serving as a basis for calculating a degree of attention may be the number of unique users or may be repeatedly counted for the same user. For example, when it is determined that the user A has gazed at the avatar of the other user and then the user A gazes at the avatar of the other user again after a predetermined period has elapsed (for example, one or more days have elapsed) after the number of users gazing at the avatar of the other user has been increased by one, the setting unit 13 may additionally increase the number of users gazing at the avatar of the other user by one.

The degree of attention may be set according to a length of a gaze period in addition to a gaze number (the number of users). For example, the setting unit 13 may set a rate of increase of the degree of attention to be higher as a period in which the user A has gazed at the avatar of the other user becomes longer. For example, the setting unit 13 may increase the degree of attention for the avatar of the other user by a value corresponding to one user when the period in which the user A has gazed at the avatar of the other user is equal to or greater than 5 seconds and less than 10 seconds and increase the degree of attention for the avatar of the other user by a value corresponding to two users when the period in which the user A has gazed at the avatar of the other user is equal to or greater than 10 seconds. The same is true of the degrees of partial attention correlated with parts.

The delivery unit 14 generates and delivers content data for each user. The content data delivered to the users varies for each user. Specifically, a content image included in the content data delivered to each user is generated based on a viewpoint of a virtual camera correlated with the user and thus varies for each user. The content data includes display information associated with the degree of attention for each avatar which is superimposed on the content image. That is, the delivery unit 14 serves as a notification unit notifying each user of the degree of attention set for each avatar.

An example of operations (including a content provision method according to the embodiment) of the content provision system 1 will be described below with reference to the sequence diagram illustrated in FIG. 3. Here, processes for one user (the user A) will be described below. That is, the operations of the content provision system 1 will be described with a focus on processes between the HMD 30A used by the user A and the content provision device 10 will be described.

In Step S1, the motion detecting unit 31 of the HMD 30A detects a motion of the user A. In this embodiment, the motion detecting unit 31 acquires the gaze information of the user A. When the user A performs an operation of instructing to change a position or a pose of an avatar corresponding to the user A, the motion detecting unit 31 acquires operation information associated with the operation.

In Step S2, the transmission unit 32 of the HMD 30A transmits the motion information including the gaze information acquired in Step S1 to the content provision device 10. When the operation information is acquired in Step S1, the motion information also includes the operation information.

In Step S3, the reception unit 11 of the content provision device 10 acquires the motion information of the user A from the HMD 30A.

In Step S4, the identification unit 12 of the content provision device 10 identifies a gaze area of the user A in the virtual space based on the motion information of the user A by performing the aforementioned process. That is, the identification unit 12 identifies a gaze area which is a local area at which the user A gazes in the threshold period or more in the virtual space.

Figure 4:
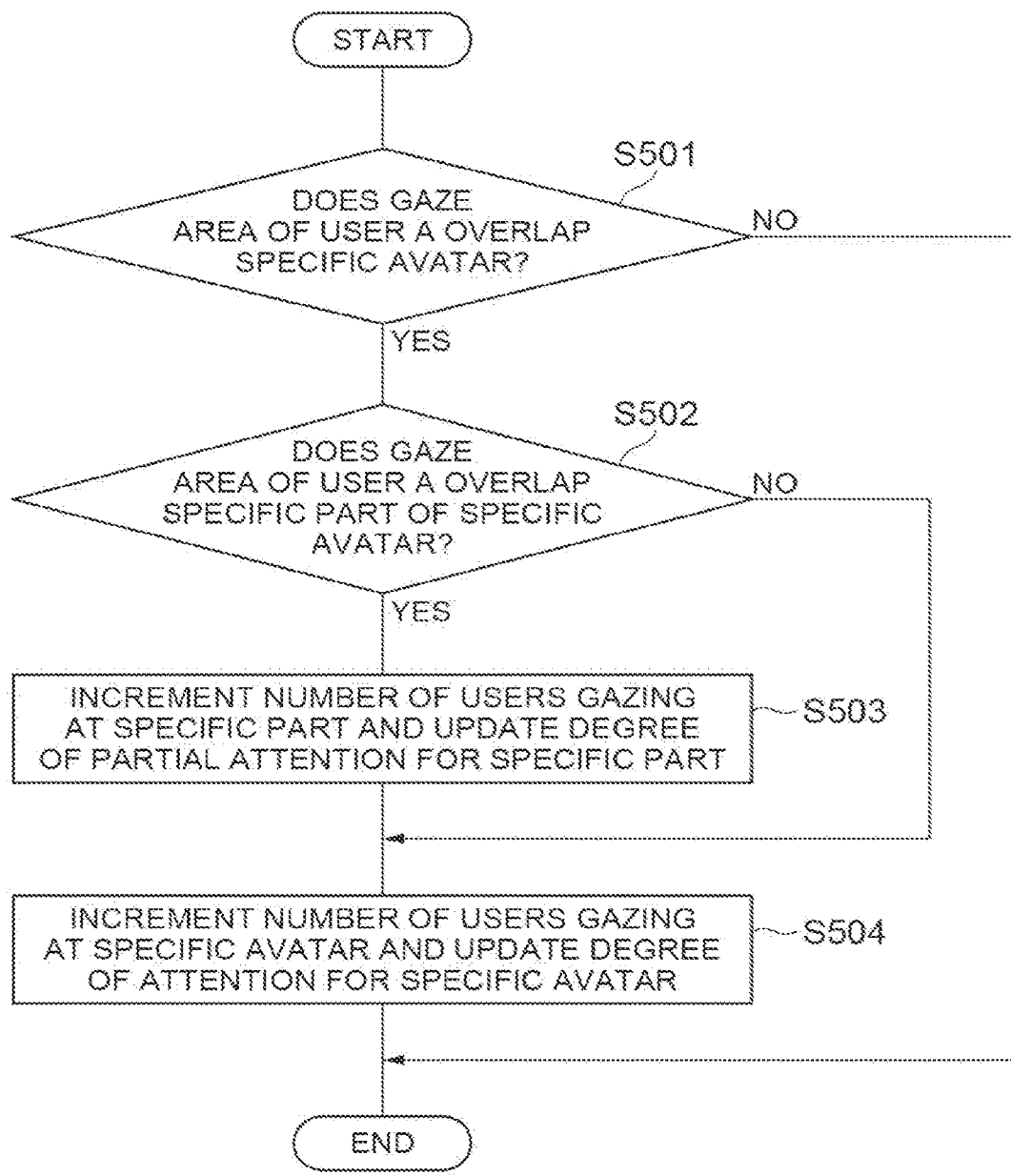
FIG. 4 is a flowchart illustrating an example of an attention degree setting process.

In Step S5, the setting unit 13 of the content provision device 10 sets a degree of attention for an avatar. Details of the process of Step S5 will be described below with reference to the flowchart illustrated in FIG. 4.

In Step S501, the setting unit 13 determines whether the gaze area of the user A overlaps with a specific avatar (an avatar of an arbitrary user other than the user A) by comparing the gaze area of the user A with information (virtual space information of avatars stored in the content storage unit 20) indicating positions (including positions of parts) of avatars (avatars of the users other than the user A). When it is determined that the gaze area of the user A does not overlap with an avatar of any user (that is, when the user A does not gaze at a specific avatar in the virtual space), the setting unit 13 ends the process for the user A (Step S501: NO). On the other hand, when it is determined that the gaze area of the user A overlaps with a specific avatar (hereinafter referred to as a "target avatar"), the setting unit 13 performs the process of Step S502 (Step S501: YES).

In Step S502, the setting unit 13 determines whether the gaze area of the user A overlaps with a specific part of the target avatar by comparing the gaze area of the user A with information (virtual space information of the target avatar stored in the content storage unit 20) indicating positions of parts of the target avatar. When it is determined that the gaze area of the user A does not overlap with a specific part (that is, when the gaze area of the user A overlaps with a plurality of parts and a part at which the user A particularly gazes out of the parts of the target avatar cannot be identified), the setting unit 13 skips the process of Step S503 and performs the process of Step S504 (Step S502: NO). On the other hand, when it is determined that the gaze area of the user A overlaps with a specific part (hereinafter referred to as a "target part") (Step S502: YES), the setting unit 13 performs the process of Step S503.

In Step S503, the setting unit 13 increases the number of users gazing at the target part of the target avatar by one. Then, the setting unit 13 sets a degree of partial attention corresponding to the increased number of gazing users (that is, the count result of the number of users determined to gaze at the target part up to now) for the target part. For example, when the number of gazing users is used as the degree of partial attention without any change, the setting unit 13 can increase the degree of partial attention for the target part by one. The setting unit 13 stores the updated degree of partial attention in the content storage unit 20 in correlation with a group of the avatar ID of the target avatar and the part ID of the target part. When the degree of partial attention correlated with the group of the avatar ID of the target avatar and the part ID of the target part is stored already in the content storage unit 20, the setting unit 13 can update the degree of partial attention stored in the content storage unit 20.

In Step S504, the setting unit 13 increases the number of users gazing at the target avatar by one. Then, the setting unit 13 sets a degree of attention corresponding to the increased number of users (that is, the count result of the number of users determined to have gazed at the target avatar up to now) for the target part. For example, when the number of gazing users is used as the degree of attention without any change, the setting unit 13 can increase the degree of attention for the target avatar by one. The setting unit 13 stores the updated degree of attention in the content storage unit 20 in correlation with the avatar ID of the target avatar. When the degree of attention correlated with the avatar ID of the target avatar is stored already in the content storage unit 20, the setting unit 13 updates the degree of attention stored in the content storage unit 20.

The aforementioned attention degree setting process (Step S5) which is performed by the setting unit 13 is performed for each of a plurality of users sharing the virtual space in addition to the user A. Accordingly, a higher degree of attention is set for an avatar attracting attention of a larger number of users. Similarly, a higher degree of partial attention is set for a part of an avatar attracting attention of a larger number of users.

Figure 5:
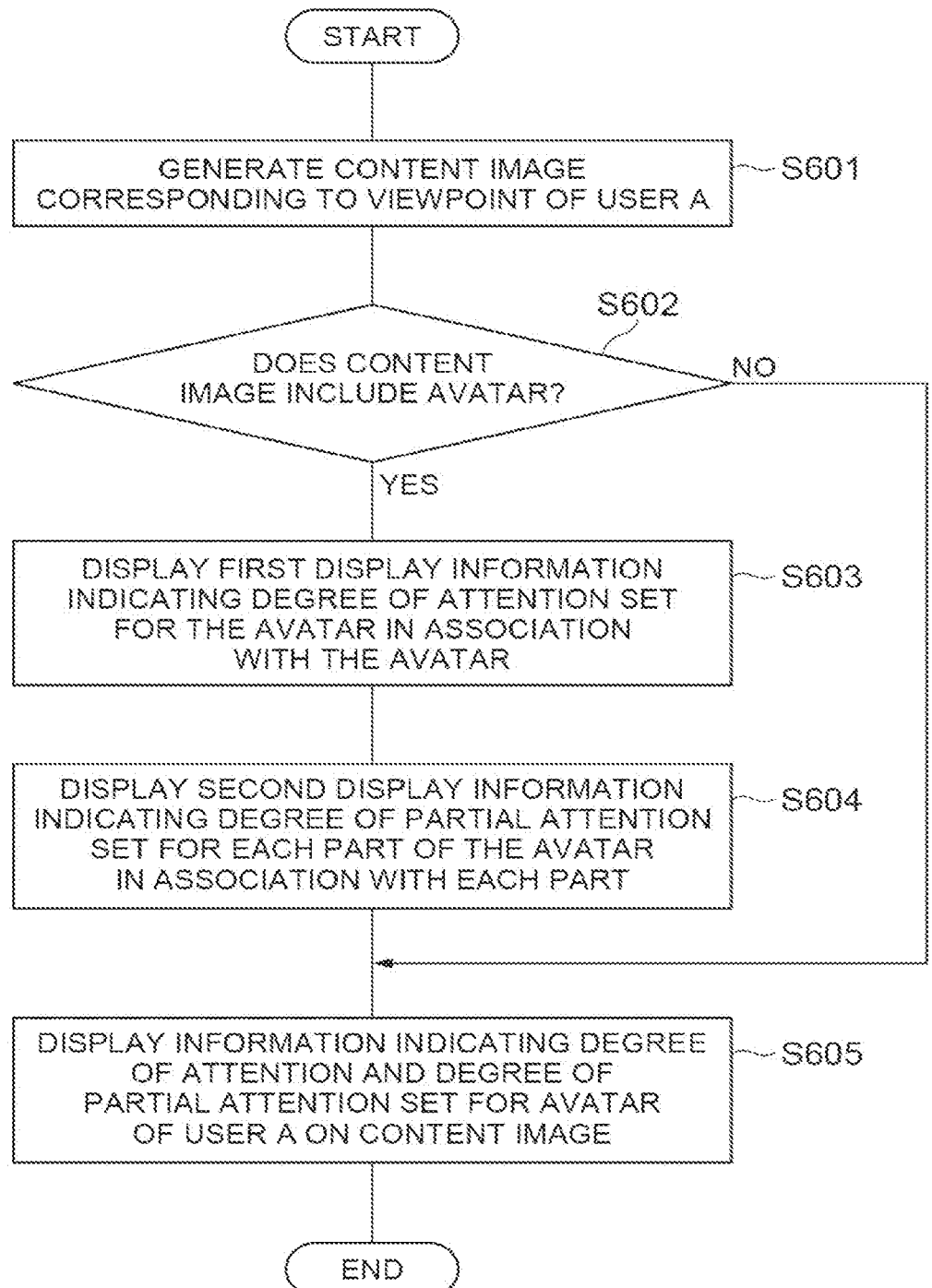
FIG. 5 is a flowchart illustrating an example of a content data generating process.

Referring back to FIG. 3, in Step S6, the delivery unit 14 of the content provision device 10 generates content data to be provided to each user. Here, a process of generating content data to be provided to the user A will be described below. Details of the process of Step S6 will be described with reference to the flowchart illustrated in FIG. 5.

Figure 6:
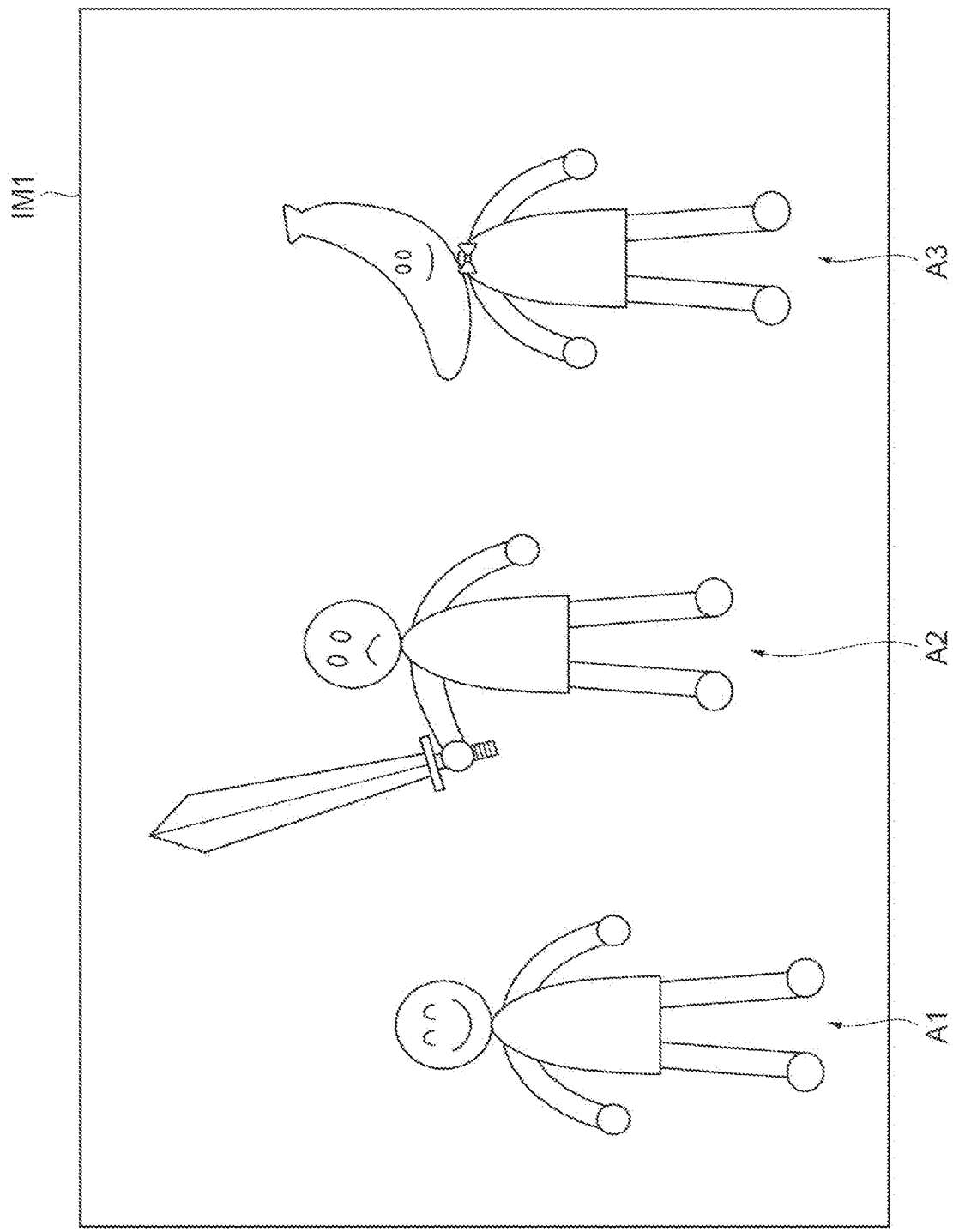
FIG. 6 is a diagram illustrating an example of a content image which is generated in Step S601 of FIG. 5.

In Step S601, the delivery unit 14 generates a content image corresponding to the viewpoint of the user A. That is, the delivery unit 14 generates a content image representing a view from the virtual camera correlated with the user A. FIG. 6 is a diagram illustrating an example of a content image (a content image IM1) which is generated in Step S601.

In Step S602, the delivery unit 14 determines whether the content image IM1 (a first content image) provided to the user A includes an avatar (a first virtual object) of a user other than the user A. When the content image IM1 does not include an avatar of the other user, the delivery unit 14 skips the processes of Steps S603 and S604 and performs the process of Step S605 (Step S602: NO). On the other hand, when the content image IM1 includes an avatar of the other user (avatars A1, A2, and A3 of three other users in this example), the delivery unit 14 performs the processes of Steps S603 and S604 (Step S602: YES).

In Step S603, the delivery unit 14 displays first display information indicating the degrees of attention set for the avatars A1, A2, and A3 on the content image IM1 in association with the avatars A1, A2, and A3.

In Step S604, the delivery unit 14 displays second display information indicating the degrees of partial attention set for parts of the avatars A1, A2, and A3 on the content image IM1 in association with the parts.

Figure 7:
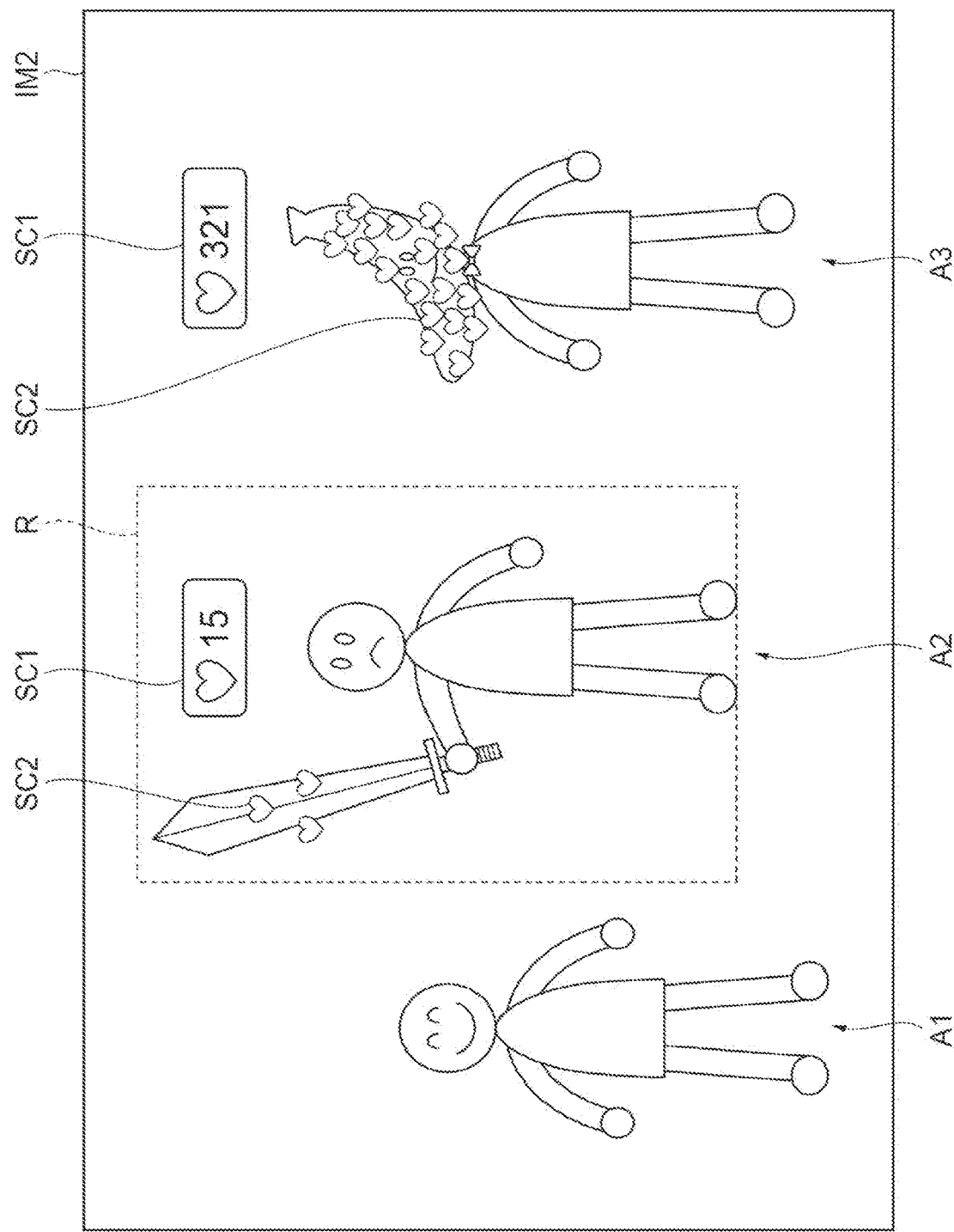
FIG. 7 is a diagram illustrating an example of a content image after the processes of Steps S603 and S604 of FIG. 5 have been performed.

FIG. 7 is a diagram illustrating an example of a content image (a content image IM2) after the processes of Steps S603 and S604 have been performed on the content image IM1.

In the example illustrated in FIG. 7, first display information SC1 indicating the degrees of attention set for the avatars A2 and A3 (the degree of attention "15" for the avatar A2 and the degree of attention "321" for the avatar A3) in association with the avatars A2 and A3 through the process of Step S603. In this example, the first display information SC1 is displayed as display information in which a figure of a heart and text (a numerical value) indicating a degree of attention are surrounded by a rectangular frame. The first display information SC1 is displayed in the vicinity of each of the avatars A2 and A3 (above each of the avatars A2 and A3 in this example).

The display position and the configuration of the first display information are not limited to this example. For example, the first display information may be displayed at a position other than above an avatar (for example, below the avatar) or may be displayed at a position overlapping with an avatar. The first display information may be expressed by only text such as "good: 15." The first display information may not include a numerical value indicating a degree of attention. For example, the first display information may be expressed by a figure colored with a color corresponding to the degree of attention (for example, a more conspicuous color as the degree of attention becomes higher), may be expressed by a figure with a shape corresponding to the degree of attention (for example, a more distinct shape as the degree of attention becomes higher), or may be expressed by a figure with a size corresponding to the degree of attention (for example, a larger size as the degree of attention becomes higher). Similarly to the example illustrated in FIG. 7, the first display information SC1 may not be displayed for the avatar A1 for which the degree of attention is not set (that is, the degree of attention is "0"). In this case, a user can ascertain that the degree of attention for the avatar A1 is "0" in that the first display information SC1 is not displayed.

In the example illustrated in FIG. 7, second display information SC2 indicating degrees of partial attention set for a part of the avatar A2 (a "sword" hold by a hand of the avatar A2 in this example) and a part of the avatar A3 (a "head" of the avatar A3 in this example) is displayed in association with the parts through the process of Step S604. In this example, the "sword" hold by the avatar A2 attracts attention to a certain extent, and the distinct head (the head of a banana shape in this example) of the avatar A3 attracts much attention. That is, the degree of partial attention set for the part "head" of the avatar A3 is higher than the degree of partial attention set for the "sword" of the avatar A2. In this example, the second display information SC2 is displayed on the parts (or in the vicinity of the parts). The second display information SC2 is expressed by a number of heart marks corresponding to the degrees of partial attention (the number is larger as the degree of attention becomes higher). Similarly to the first display information, the display position and the configuration of the second display information are not limited to this example.

In Step S605, the delivery unit 14 may additionally superimpose the display information indicating the degree of attention set for the avatar of the user A (a first avatar) and the degree of partial attention set for each part of the avatar on the content image IM2. For example, the delivery unit 14 may superimpose display information in which the avatar of the user A, the first display information corresponding to the degree of attention set for the avatar of the user A, and the second display information corresponding to the degree of partial attention set for each part of the avatar of the user A are expressed small at a corner (for example, a right-lower corner) of the content image IM2. For example, the delivery unit 14 may display information (that is, display information including the avatar A2, the first display information SC1 of the avatar A2, and the second display information SC2 of each part of the avatar A2) in which an area R in FIG. 7 is cut out and reduced on the content image provided to the user corresponding to the avatar A2. With this display information, each user can easily ascertain to what extent an avatar (and a part) of the user attracts attention of the other users.

Referring back to FIG. 3, in Step S7, the delivery unit 14 transmits content data including the content image generated in Step S6 (the content image processed in Step S603, S604, and S605) to the HMD 30A of the user A. The content data is received by the reception unit 33 of the HMD 30A.

In Step S8, the display control unit 34 of the HMD 30A displays the content image received in Step S7 on the display of the HMD 30A.

The aforementioned processes of Steps S1 to S8 are periodically repeatedly performed. The content provision device 10 periodically repeatedly performs the same processes as the processes for the HMD 30A (Steps S1 to S8) for the HMDs 30 of the users other than the user A. As a result, to what extent an avatar (and a part) of a certain user attracts attention can be shared intuitively in real time by a plurality of users sharing the virtual space generated by the content provision device 10.

As described above, in the content provision device 10, a gaze area at which each user has gazed in the threshold period or longer is identified in a virtual space, and the number of users gazing at an avatar disposed in the virtual space is counted based on a positional relationship between the gaze area and the avatar. Then, a degree of attention based on the count result is set for the avatar, and the users are notified of the degree of attention set for the avatar. Accordingly, with the content provision device 10, it is possible to automatically set an attention status of each avatar in the virtual space and to notify the users of the attention status of each avatar in real time. With this configuration, it is possible to effectively improve an entertainment property of a virtual experience of a user.

For example, when a plurality of users have conversations with each other using avatars in a virtual space, the user can enjoy a virtual experience while ascertaining attention statuses of the avatars in real time. More specifically, in a virtual space in which avatars of users are arranged, the users can cause the avatars to wear a costume, a decoration, a fancy dress, or the like in which the user's taste, individuality, and the like are reflected. With the content provision device 10, it is possible to automatically evaluate the avatars by counting the number of users gazing at the costume or the like. That is, the users do not have to perform complicated operations of explicitly selecting favorite costumes of the avatars and evaluating the selected costumes to be "good." Since an avatar (or a part) having attracted attention of a plurality of users in the virtual space can be automatically ascertained, it is possible to easily ascertain a trend of an article (for example, items such as a dress, an accessory, or a decoration worn by an avatar) easily attracting attention in the virtual space in real time.

When a first content image provided to a first user includes an avatar (a first virtual object), the delivery unit 14 displays first display information indicating a degree of attention set for the avatar on the first content image in association with the avatar. In this embodiment, in the delivery unit 14, the content image IM1 (the first content image) provided to the user A (the first user) includes avatars A1, A2, and A3 (the first virtual objects) (see FIG. 6). In this case, the delivery unit 14 displays first display information SC1 indicating degrees of attention set for the avatars A1, A2, and A3 on the content image IM2 in association with the avatars A1, A2, and A3 (see FIG. 7). In this embodiment, the first display information SC1 of the avatar A1 with a degree of attention of 0 is not displayed. With this configuration, it is possible to visually present display information (the first display information SC1) indicating a degree of attention for an avatar using the content image. As a result, it is possible to allow a user to intuitively ascertain to what extent each avatar included in the content image attracts attention.

When each avatar includes a plurality of parts (partial areas), the setting unit 13 counts the number of users gazing at a part for each part and to additionally set a degree of partial attention based on the count result. The delivery unit 14 additionally notifies the users of the degree of partial attention for each part. With this configuration, it is possible to allow a user to ascertain a part particularly attracting attention out of the parts of each avatar.

When the first content image provided to the first user includes an avatar (a first virtual object), the delivery unit 14 displays first display information indicating a degree of attention set for the avatar on the first content image in association with the avatar and displays second display information indicating a degree of partial attention set for a part of the avatar. In this embodiment, in the delivery unit 14, the content image IM1 (the first content image) provided to the user A (the first user) includes avatars A1, A2, and A3 (the first virtual objects) (see FIG. 6). In this case, the delivery unit 14 displays first display information SC1 indicating degrees of attention set for the avatars A1, A2, and A3 on the content image IM2 in association with the avatars A1, A2, and A3 and displays second display information SC2 indicating the degrees of partial attention set for a part "sword" of the avatar A2 and a part "head" of the avatar A3 in association with the parts (see FIG. 7). With this configuration, it is possible to visually present display information (the second display information SC2) indicating a degree of partial attention set for a part of an avatar using the content image. As a result, it is possible to allow a user to more intuitively ascertain a part particularly attracting attention in an avatar included in the content image.

The delivery unit 14 notifies the first user of the degree of attention set for a first avatar corresponding to the first user. In this embodiment, the delivery unit 14 notifies the user A of the degree of the avatar of the user A by displaying information indicating the degree of attention set for the avatar corresponding to the user A on the content image provided to the user A (see Step S605 in FIG. 5). With this configuration, it is possible to allow a user to ascertain to what extent the avatar of the user attracts attention of other users. When the degree of attention is high, it is possible to give great satisfaction to the user. When the degree of attention is low, it is possible to prompt the user to change a costume or the like.

The delivery unit 14 notifies the first user of the degree of attention set for the first avatar corresponding to the first user and additionally notifies the first user of the degree of partial attention for each part of the first avatar. In this embodiment, the delivery unit 14 notifies the user A of the degree of attention for the avatar of the user A and the degree of partial attention for each part of the avatar by displaying information indicating the degree of partial attention set for each part for the avatar corresponding to the user A on the content image provided to the user A (see Step S605 in FIG. 5). With this configuration, it is possible to allow a user to ascertain to what extent a part of an avatar of the user attracts attention.

The identification unit 12 identifies a gaze area of a user based on gaze information on the user's gaze detected by a head-mounted display (HMD 30) worn on the head of the user. With this configuration, it is possible to appropriately identify a position at which the user's gaze stays (that is, a gaze area at which the user has gazed in a predetermined time or longer) based on the user's gaze detected by the HMD 30 such as smart glasses (XR glasses) disposed in front of the user's eyes.

(Modified Example of Attention Degree Setting Process)

Figure 3:
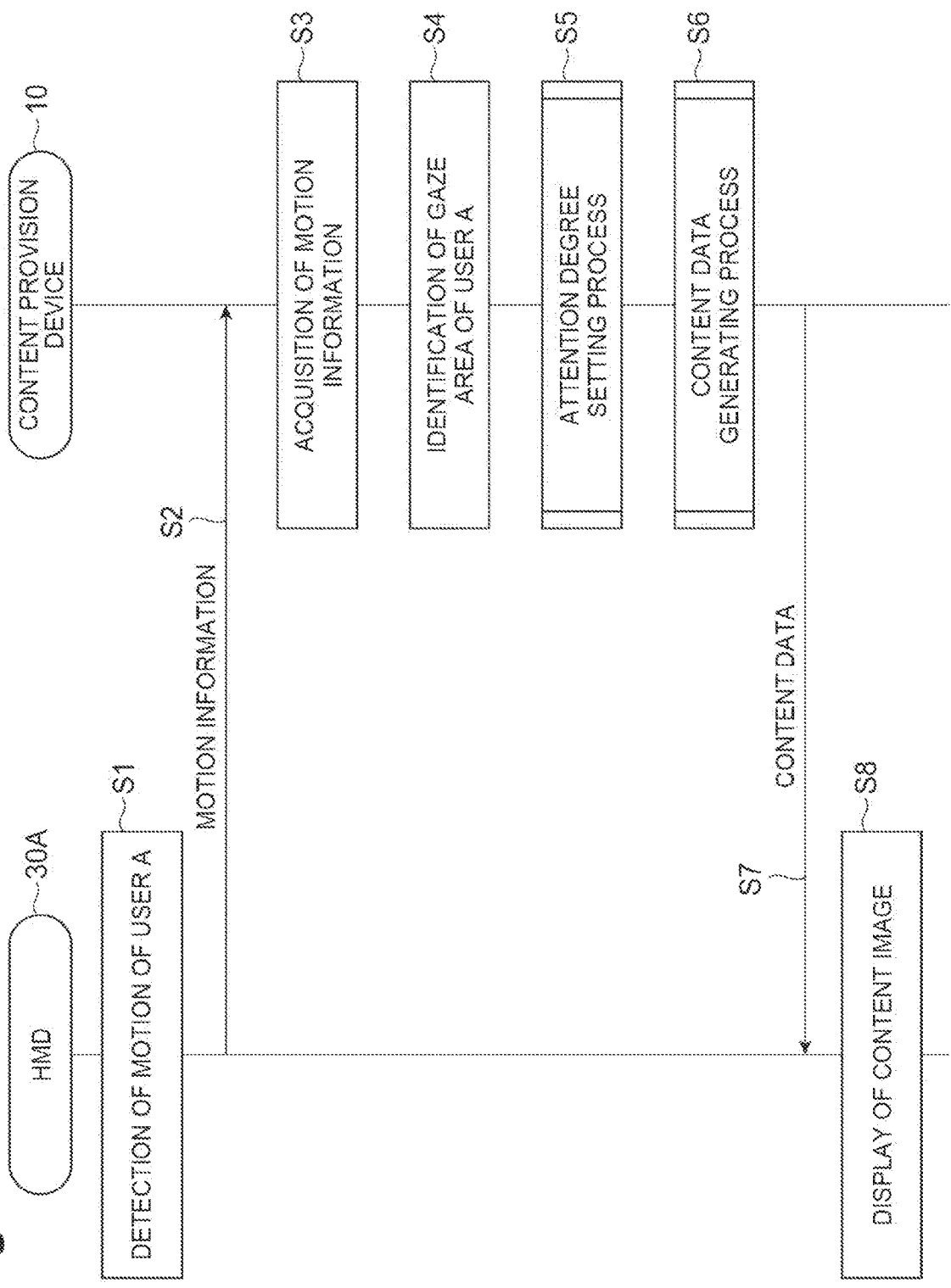
FIG. 3 is a sequence diagram illustrating an example of operations in the content provision system.
Figure 8:
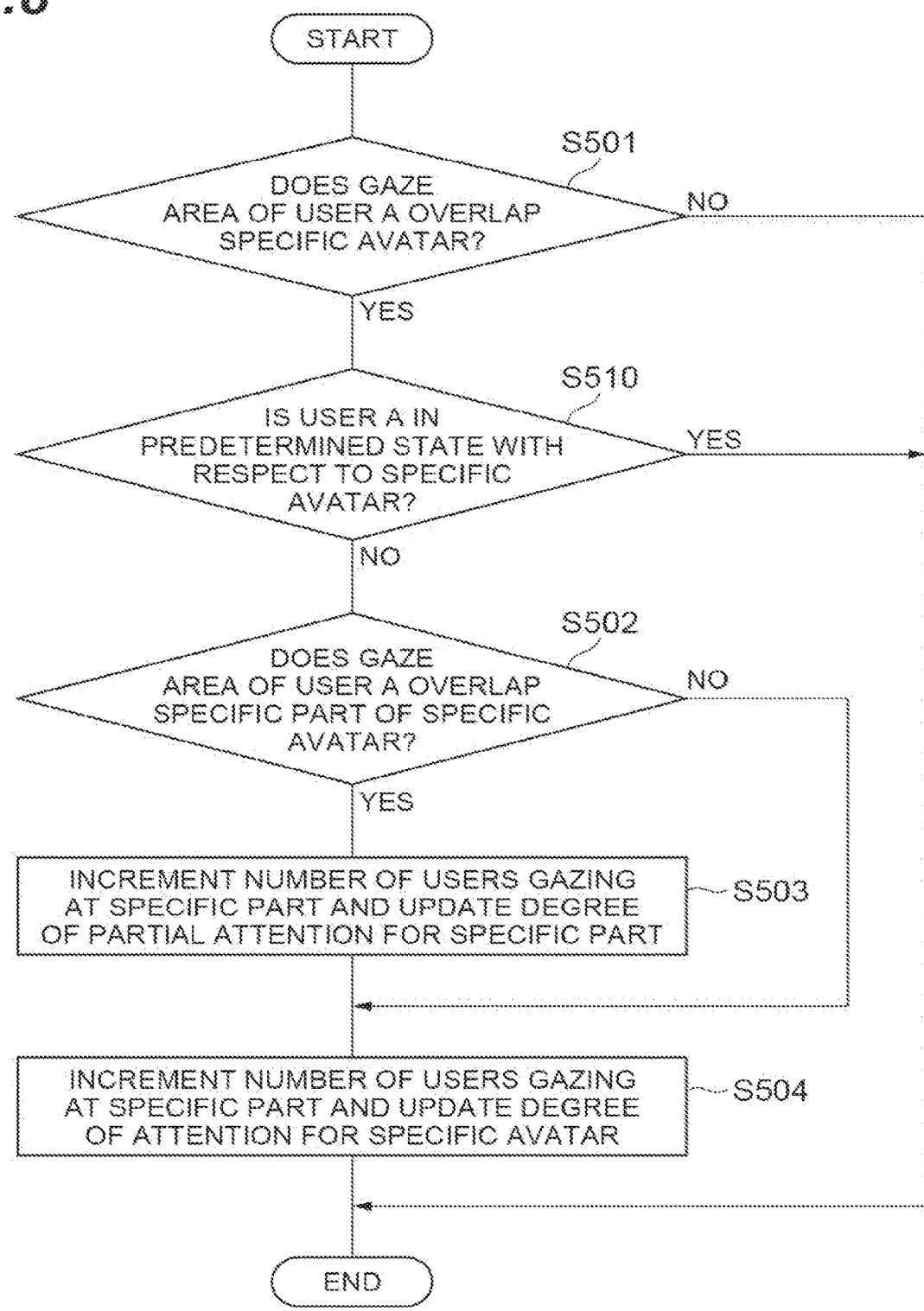
FIG. 8 is a flowchart illustrating a modified example of the attention degree setting process.

FIG. 8 is a flowchart illustrating a modified example of the attention degree setting process (Step S5 in FIG. 3). The attention degree setting process according to the modified example illustrated in FIG. 8 is different from the attention degree setting process according to the embodiment (see FIG. 4) in that Step S510 is provided between Step S501 and Step S502. In the attention degree setting process according to the modified example, the setting unit 13 excludes a user in a predetermined state with respect to an avatar and counts the number of users gazing at the avatar.

More specifically, in Step S510, when it is determined in Step S501 that the gaze area of the user A overlaps with a specific avatar and the user A is in a predetermined state with respect to the specific avatar (hereinafter referred to as a "specific state"), the setting unit 13 does not count the user A as a user gazing at the specific avatar (a part included in the avatar). That is, the setting unit 13 skips the processes of Steps S502 to S504 when the determination result of Step S510 is "YES."

The specific state is, for example, a state in which the user A has a conversation with the specific avatar. Whether the user A has a conversation with the specific avatar can be determined, for example, based on whether the user A has performed explicit operation for making a conversion with the specific avatar (for example, whether voice call connection has been established between the user A and a user corresponding to the specific avatar).

For example, it is assumed that the user A has a conversation with a user corresponding to the avatar A2 in the example illustrated in FIG. 6. In this case, the user A naturally gives attention to the avatar A2 corresponding to the user who is a conversion partner. That is, even when the user A gazes at the avatar A2 in a predetermined period or longer, it does not mean that the user A gazes at the avatar A2 with attention to a costume or the like of the avatar A2. Accordingly, when the number of users gazing at the avatar during conversion is counted and a degree of attention (or a degree of partial attention) of the avatar (or a part) is set, the degree of attention (or the degree of partial attention) for the avatar (or the part) of a user who often has a conversation with many users is increased and it may not be possible to appropriately set a pure degree of attention to an avatar's design, appearance, and the like. According to the modified example of the attention degree setting process (FIG. 8), it is possible to appropriately set a pure degree of attention to an avatar's design, appearance, and the like by excluding a user who is in a specific state with respect to the avatar at which the user gazes at (for example, a state in which the user has a conversation with the avatar).

(Other Modified Examples)

In the aforementioned embodiment, a head-mounted display (HIMD) is exemplified as a user terminal which is used by each user, but the user terminal may be a device such as a smartphone or a game terminal other than the HMD.

In the aforementioned embodiment, a degree of attention and a degree of partial attention have been notified of using a content image, but the degree of attention and the degree of partial attention may be notified of using a means (for example, vocal sound) other than a content image.

In the aforementioned embodiment, avatars of users are exemplified as virtual objects of which a degree of attention and a degree of partial attention are set, but a degree of attention and a degree of partial attention may be set for a virtual object other than an avatar. For example, a degree of attention and a degree of partial attention may be set for a stationary virtual object such as furniture and cooked food. A degree of attention and a degree of partial attention may be set for a dynamic virtual object such as an animal, a robot, or a non-player character (NPC) such as a human figure.

The attention degree setting process (Step S5) may be performed only in a predetermined specific situation. For example, when an event such as a fancy-dress party is held in a virtual space, the attention degree setting process may be performed only on avatars present in the place of the fancy-dress party. In this way, by limiting a situation in which the attention degree setting process is performed, it is possible to reduce a processing load of the content provision device 10 in comparison with a case in which the attention degree setting process is normally performed in all places in the virtual space.

Function allocation between a server (the content provision device 10) and a user terminal (the HMD 30) is not limited to the aforementioned embodiment (see FIG. 2). For example, some processes of the content provision device 10 may be performed by the user terminal. For example, in the embodiment, a content image to be provided to each user is generated (drawn) by the server (the content provision device 10), but the content image drawing process may be performed by the user terminal (the HMD 30) or may be cooperatively performed by the server and the user terminal. For example, the process of superimposing first display information and second display information on the content image may be performed by the user terminal. In this case, for example, the delivery unit 14 may transmit data of the content image IM1 illustrated in FIG. 6 and data indicating the degrees of attention and the degrees of partial attention for the avatars A1, A2, and A3 (and parts of the avatars) included in the content image IM1 to the HMD 30A. Then, the display control unit 34 of the HMD 30A may generate the content image IM2 illustrated in FIG. 7 by combining the received data.

The content provision device 10 may not perform all the processes described above in the embodiment. For example, the content provision device 10 may be configured to set and notify of only a degree of attention for each avatar. In this case, a part of the attention degree setting process (Steps S502 and S503 in FIG. 4) and a part of the content data generating process (Step S604 in FIG. 5) can be skipped.

The block diagrams used in the description of the embodiment show blocks in units of functions. These functional blocks (components) are realized in any combination of at least one of hardware and software. Further, a method of realizing each functional block is not particularly limited.

That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but not limited thereto.

Figure 9:
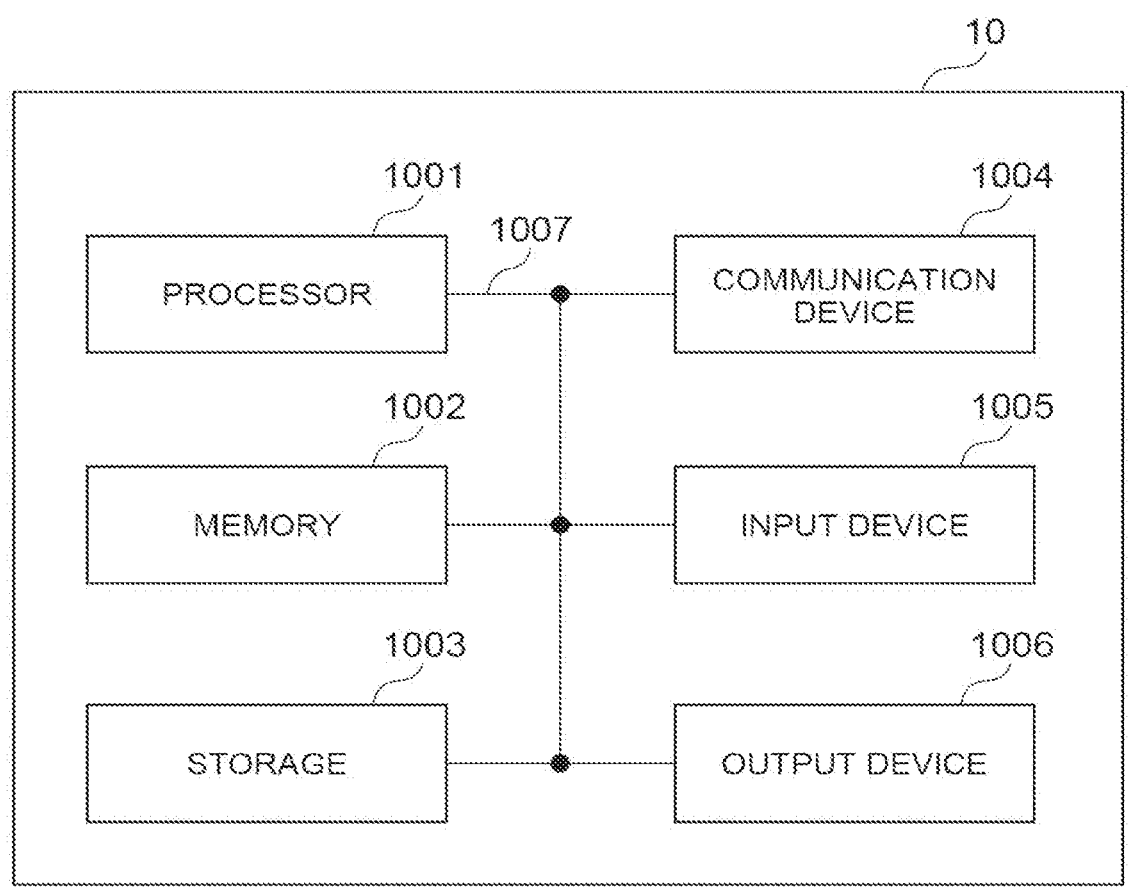
FIG. 9 is a diagram illustrating an example of a hardware configuration of the content provision device.

For example, the content provision device 10 according to an embodiment of the present invention may function as a computer that performs content provision method of the present disclosure. FIG. 9 is a diagram illustrating an example of a hardware configuration of the content provision device 10 according to the embodiment of the present disclosure. The content provision device 10 described above may be physically configured as a computer device including a processor 1001, a memory 1002, a storage 1003, a communication device 1004, an input device 1005, an output device 1006, a bus 1007, and the like.

In the following description, the term "device" can be referred to as a circuit, a device, a unit, or the like. The hardware configuration of the content provision device 10 may include one or a plurality of devices illustrated in FIG. 9, or may be configured without including some of the devices. The user terminal (HMD 30) may also have a hardware configuration similar to that of the content provision device 10 shown in FIG. 9.

Each function in the content provision device 10 is realized by loading predetermined software (a program) into hardware such as the processor 1001 or the memory 1002 so that the processor 1001 performs computation to control communication that is performed by the communication device 1004 or control at least one of reading and writing of data in the memory 1002 and the storage 1003.

The processor 1001, for example, operates an operating system to control the entire computer. The processor 1001 may be configured as a central processing unit (CPU) including an interface with peripheral devices, a control device, a computation device, a register, and the like.

Further, the processor 1001 reads a program (program code), a software module, data, or the like from at one of the storage 1003 and the communication device 1004 into the memory 1002 and executes various processes according to the program, the software module, the data, or the like. As the program, a program for causing the computer to execute at least some of the operations described in the above-described embodiment may be used. For example, each functional unit (e.g., the setting unit 13) of the content provision device 10 may be realized by a control program that is stored in the memory 1002 and operated on the processor 1001, and other functional blocks may be realized similarly. Although the case in which the various processes described above are executed by one processor 1001 has been described, the processes may be executed simultaneously or sequentially by two or more processors 1001. The processor 1001 may be realized using one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement the content provision method according to the embodiment of the present disclosure.

The storage 1003 is a computer-readable recording medium and may also be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including at least one of the memory 1002 and the storage 1003, a server, or another appropriate medium.

The communication device 1004 is hardware (a transmission and reception device) for performing communication between computers via at least one of a wired network and a wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured using a single bus or may be configured using buses different between the devices.

Further, the content provision device 10 may include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented by at least one of these pieces of hardware.

Although the present embodiment has been described in detail above, it is apparent to those skilled in the art that the present embodiment is not limited to the embodiments described in the present disclosure. The present embodiment can be implemented as a modification and change aspect without departing from the spirit and scope of the present invention determined by description of the claims. Accordingly, the description of the present disclosure is intended for the purpose of illustration and does not have any restrictive meaning with respect to the present embodiment.

A process procedure, a sequence, a flowchart, and the like in each aspect/embodiment described in the present disclosure may be in a different order unless inconsistency arises. For example, for the method described in the present disclosure, elements of various steps are presented in an exemplified order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present disclosure may be used alone, may be used in combination, or may be used by being switched according to the execution. Further, a notification of predetermined information (for example, a notification of "being X") is not limited to be made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless whether the software is called software, firmware, middleware, microcode, or hardware description language or called another name.

Further, software, instructions, information, and the like may be transmitted and received via a transmission medium. For example, when software is transmitted from a website, a server, or another remote source using wired technology (a coaxial cable, an optical fiber cable, a twisted pair, a digital subscriber line (DSL), or the like) and wireless technology (infrared rays, microwaves, or the like), at least one of the wired technology and the wireless technology is included in a definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of them.

Further, the information, parameters, and the like described in the present disclosure may be expressed using an absolute value, may be expressed using a relative value from a predetermined value, or may be expressed using another corresponding information.

Names used for the above-described parameters are not limited names in any way. Further, equations or the like using these parameters may be different from those explicitly disclosed in the present disclosure. Since various information elements can be identified by any suitable names, the various names assigned to these various information elements are not limited names in any way.

The description "based on (on the basis of)" used in the present disclosure does not mean "based only on" unless otherwise noted. In other words, the description "based on" means both of "based only on" and "based at least on".

Any reference to elements using designations such as "first," "second," or the like used in the present disclosure does not generally limit the quantity or order of those elements. These designations may be used in the present disclosure as a convenient way for distinguishing between two or more elements. Thus, the reference to the first and second elements does not mean that only two elements can be adopted there or that the first element has to precede the second element in some way.

When "include", "including" and transformation of them are used in the present disclosure, these terms are intended to be comprehensive like the term "comprising". Further, the term "or" used in the present disclosure is intended not to be exclusive OR.

In the present disclosure, for example, when articles such as "a", "an", and "the" in English are added by translation, the present disclosure may include that nouns following these articles are plural.

In the present disclosure, a sentence "A and B are different" may mean that "A and B are different from each other". The sentence may mean that "each of A and B is different from C". Terms such as "separate", "coupled", and the like may also be interpreted, similar to "different".

REFERENCE SIGNS LIST

1 Content provision system
10 Content provision device
11 Reception unit
12 Identification unit
13 Setting unit
14 Delivery unit (notification unit)
20 Content storage unit
30, 30A, 30B, 30C HMD
31 Motion detecting unit
32 Transmission unit
33 Reception unit
34 Display control unit
A1, A2, A3 Avatar (virtual object)
IM1, IM2 Content image
SC1 First display information
SC2 Second display information

The invention claimed is:

1. A content provision device that provides a content image indicating a virtual space which is shared by a plurality of users to the users, the content provision device comprising:
   processing circuitry configured to
      identify a gaze area at which each of the users gazes in a period of a predetermined threshold value or more in the virtual space;
      count the number of users gazing at a virtual object disposed in the virtual space based on a positional relationship between the gaze area of each of the users and the virtual object and set a degree of attention based on the count result for the virtual object; and
      notify the users of the set degree of attention for the virtual object,
   wherein, when a first virtual object is included in a first content image provided to a first user, the processing circuitry displays first display information indicating the set degree of attention for the first virtual object on the first content image in association with the first virtual object.

2. The content provision device according to claim 1, wherein, when the virtual object includes a plurality of partial areas, the processing circuitry additionally counts the number of users gazing at a partial area for each of the plurality of partial areas and additionally sets a degree of partial attention based on the count result, and
wherein the processing circuitry additionally notifies each of the users of the degree of partial attention for each partial area.

3. The content provision device according to claim 2, wherein, when a first virtual object is included in a first content image provided to a first user, the processing circuitry displays first display information indicating the degree of attention set for the first virtual object on the first content image in association with the first virtual object and displays second display information indicating the degree of partial attention set for a partial area of the first virtual object in association with the partial area.

4. The content provision device according to claim 1, wherein the virtual object includes an avatar corresponding to each of the users, and
wherein the processing circuitry notifies a first user of the degree of attention set for a first avatar corresponding to the first user.

5. The content provision device according to claim 2, wherein the virtual object includes an avatar corresponding to each of the users, and
wherein the processing circuitry notifies a first user of the degree of attention set for a first avatar corresponding to the first user and additionally notifies the first user of the degree of partial attention for each of the partial areas of the first avatar.

6. The content provision device according to claim 1, wherein the processing circuitry counts the number of users gazing at the virtual object without counting a user in a predetermined state with respect to the virtual object.

7. The content provision device according to claim 6, wherein the virtual object is an avatar corresponding to a predetermined user, and
wherein the predetermined state is a state in which the user is having a conversation with the virtual object.

8. The content provision device according to claim 1, wherein the processing circuitry identifies the gaze area of a user based on gaze information on the user's gaze detected by a head-mounted display worn on a head of the user.

9. A method, implemented by processing circuitry of a content provision device that provides a content image indicating a virtual space which is shared by a plurality of users to the users, the method comprising:
identifying a gaze area at which each of the users gazes in a period of a predetermined threshold value or more in the virtual space;
counting the number of users gazing at a virtual object disposed in the virtual space based on a positional relationship between the gaze area of each of the users and the virtual object and setting a degree of attention based on the count result for the virtual object; and
notifying the users of the set degree of attention for the virtual object,
wherein, when a first virtual object is included in a first content image provided to a first user, the method includes displaying first display information indicating the set degree of attention for the first virtual object on the first content image in association with the first virtual object.

* * * * *